April 5, 1960
P. ROBINSON
2,931,961
HIGH ENERGY STORAGE CAPACITOR
Filed Feb. 15, 1955
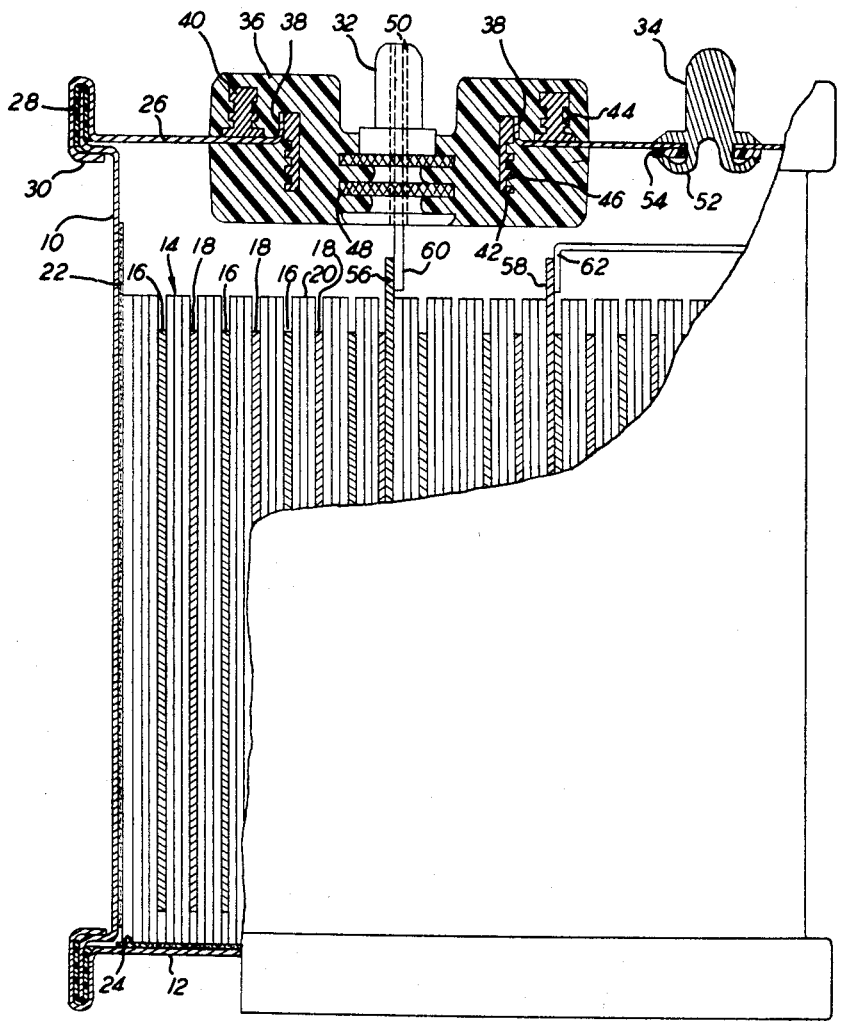
INVENTOR.
PRESTON ROBINSON
BY
HIS ATTORNEYS

United States Patent Office 2,931,961
Patented Apr. 5, 1960

2,931,961

HIGH ENERGY STORAGE CAPACITOR

Preston Robinson, Williamstown, Mass., assignor to Sprague Electric Company, North Adams, Mass., a corporation of Massachusetts Application February 15, 1955, Serial No. 488,321

1 Claim. (Cl. 317—258)

This invention relates to electrical capacitors, particularly those that will store a considerable amount of electrical energy in a relatively small bulk. This application is in part a continuation of copending patent application Ser. No. 340,720, filed March 6, 1953, now U.S. Patent No. 2,711,498, issued June 21, 1955.

Among the objects of the present invention is the provision of an electrical storage capacitor which stores an unusually large amount of energy in a comparatively small bulk.

The above as well as additional objects of the invention will be more clearly understood from the following description of several of its exemplifications, reference being made to the accompanying drawing wherein:

The figure is a partly broken-away view of a storage capacitor illustrative of the present invention.

At first glance it might be expected that in order to provide maximum capacitance a dielectric of very high dielectric constant should be used. This follows from the well known principle that the capacitance of a capacitor is proportional to the dielectric constant of its dielectric. In other words the higher the dielectric constant the greater the capacitance available from the same volume of dielectric. Although commercial capacitor dielectrics are known with dielectric constants as high as 10, it has been discovered that these materials do not provide a capacitor with maximum energy density.

According to the present invention an unusually desirable form of capacitor for such purposes is one having an inter-electrode spacer of kraft paper having an apparent specific gravity of 1.02 or higher, the spacer being impregnated with a dielectric selected from the class consisting of liquid polybutenes and unsaturated liquid linear polymerization products of a mixture of aliphatic monolefins having less than 12 carbon atoms at least half of such monolefins having four carbon atoms, and 0.5 to 10% by weight of an aliphatic diolefin having less than 12 carbon atoms, said products having an iodine number as determined by Wijs' method between 20 and 70, the dielectric having an average molecular weight between 1200 and 4200 and containing substantially no molecules with a molecular weight lower than 450. A preferred mixed polymer composition is one that has an average molecular weight between 2800 and 3500, and an iodine number between 30 and 50.

Although the above impregnant has a dielectric constant only slightly above 2, it has been found that such an impregnated dielectric is so much more suited for withstanding high electrical stresses that the poorer dielectric constant is more than made up for.

The polybutenes of the present invention are made by polymerizing isobutylene (2-methyl propene), butene-1 or butene-2, or mixtures thereof, at temperatures of about −10° F. using polymerization catalysts such as boron trifluoride, aluminum chloride. Examples of such polymers are described in U.S. Patents 2,226,589, 2,226,590, 2,300,072, 2,216,372 and 2,181,188.

The mixed polymers of the present invention are described in copending application Ser. No. 340,720, now U.S. Patent No. 2,711,498, issued June 21, 1955, and as there indicated are made by polymerizing a suitable mixture of monolefin with diolefin at a temperature below 100° C. A major portion of the monolefin should be butylene or isobutylene. The balance of the monolefin can be any other aliphatic monolefin containing up to 12 carbon atoms. Examples of such other monolefines are:

| | |
|---|---|
| Propylene | Hexane-1 |
| Pentene-1 | 2-methylpentene-1 |
| Pentene-2 | Octene-1 |
| 3-methylbutene-1 | 6-ethyloctene-1 |

Examples of suitable diolefins are:

| | |
|---|---|
| Butadiene-1,3 | Pentadiene-1,4 |
| Butadiene-1,2 | Hexadiene-1,5 |
| Beta-methyl butadiene-1,3 | 2,5-dimethyl hexadiene-1,5 |
| Alpha-methyl butadiene-1,3 | 1,1,5-trimethyl hexadiene-1,5 |
| Diisopropenyl ethane | Octadiene-1,4 |
| 1,1,3-trimethylbutadiene-1,3 | |

In the above polymers, as much of the low molecular weight material as possible should be removed, as by distillation. Any ingredients distilling over at a temperature of 400° F. or below at atmospheric pressure should be rejected. The desired cut, after collection, is filtered through fuller's earth, maintained at a temperature of about 100° C. so that it will filter fairly readily.

The high density paper of the present invention can be made from the conventional paper making slurry used to make the thin low density papers of the prior art. Representative pulps of this type are disclosed in U.S. Patent 1,850,702, granted March 22, 1932; U.S. Patent 2,505,545, granted April 25, 1950; Australian Patent 116,594; the Miller et al. article on pages 20 to 24 inclusive of the December 1947 edition of the "General Electric Review," and the Race et al. article on pages 792 to 798 inclusive in the November 1940 issue of the "Paper Industry and Paper World." These pulps are sheeted out on a standard type of Fourdrinier machine, but with the wire traveling at about 30 feet a minute or less and a pulp having a concentration of about 0.5%, the rate of pulp addition being kept up to a value such that a wet web having a caliper of about 1 mil is produced. The entire machine can be slowed down from conventional operating speed for this purpose, except for the speed of pulp slurry feed that can be kept at the conventional rate used for preparing a 0.5 mil thick wet web. Paper coming from the calender will then have an apparent density of over 1.01, after the standard supercalendering operation will be above 1.02 generally about 1.04, and will be suitable for the present invention.

The apparent density can be measured by the A.S.T.M. designation: D202–52T Test Procedure, Number 11, set forth in A.S.T.M. Standards, 1952, part 6, page 989.

Suitable papers in accordance with the present invention can also be made by using the modified process described in copending Hard and Sproull U.S. patent application Serial No. 199,328, filed December 5, 1950, now abandoned.

According to the present invention a capacitor of the above-described type will satisfactorily withstand electrical breakdown at potentials of 7000 volts or higher, and can be safely used at operating potentials of about half that value. A standard convolutely wound pair of foils with both sides of each foil spaced from each other by an assembly of four laminations of the first of the above papers having a density of 1.045 and a thickness of 0.3 mil impregnated with the mixed polymer described in the specific example of copending application Serial No. 340,720, now U.S. Patent No. 2,711,498, issued June 21, 1955, will provide 8 microfarads of capacitance in a volume of less than 30 cubic inches. Identical capacitors with paper having a specific gravity of 1.01 or below, break down at a potential 1000 to 2000 volts lower than that indicated above and would be limited to use at lower voltages. Furthermore, such capacitors made with the lower density paper of the prior art show an appreciably lower capacitance. By comparison the capacitors of the present invention show an energy storage effectiveness more than twice as much as prior art capacitances for the same bulk.

A feature of the present invention is that the high density papers have such a limited porosity that even in the 0.3 mil thickness, they will not permit an inked stamp pad impression to travel from one face to the other. A stamp pad ink of the conventional type such as one made with methyl violet in an alcoholic vehicle, can accordingly be used to test the paper. An impression is made with a stamp pad having a plain block printing face against one surface of the paper, and if more than about 5% of the impression appears on the opposite surface the paper should be rejected.

Referring now to the drawing, there is here illustrated a capacitor in accordance with this invention. A metal can 10 with an integral or separate bottom 12 carries convolutely wound capacitor section 14. The section is shown as wound with two foils 16, 18 three layers of paper 20 being used to separate each side of the foil from the adjacent foil. For maximum compactness the capacitor should be wound to such dimension that it substantially fills the container. Paper liners 22, 24 can be inserted against the walls and bottom of the container as an added precaution.

The top of the container is closed with a cover 26 that can have its margin soldered in place or else crimped around a sealing gasket 28. Where a sealing gasket is used, it is preferred that the cover have a margin wide enough to extend beyond the gasket as indicated at 30 and provide metal-to-metal contact against the side walls 10. This keeps the body of the can in good electrical engagement with the top. Electrical connections are provided by a terminal prong 32 insulated from cover 26 and another terminal prong 34 electrically connected to the cover. Prong 32 is held in place by a molded bushing 36 of phenol formaldehyde or melamine formaldehyde resin although any other thermosetting resin is suitable. The resin is molded about a cover aperture defined by an upturned flange 38. To improve the anchorage of the resin to the cover a series of generally spool shape metal inserts 40 can first be secured as by welding around the periphery of the cover aperture. An additional ring-shaped insert 42 is also shown as correspondingly fastened inside the flange 38 for the same purpose. All these inserts as well as terminal 32 itself are shown as having radially projecting webs 44, 46, 48 about 1/32 to 1/16 inch in thickness and extending out at least about 1/32 of an inch, the respective webs being spaced apart at least a distance equal to their thickness. A tinned coating on the metal cover as well as the inserts is also helpful. A passageway 50 penetrates through terminal prong 32 from one end to the other so as to communicate with the interior of the can. Prong 34 is shown as of plain or solid construction having a riveted type of anchorage 52 crimped against a gasket 54 to provide a sealed engagement.

The prongs are connected to the electrode foils as by means of tabs 56, 58 that are laid at the winding at any desired location, so that the winding operation causes the tabs to be kept in good contact with the respective foils. Extensions 60, 62 can be welded to the projecting portions of the tabs and can in turn be secured to the prongs. Extension 60 can for example be in the form of a wire threaded through the passageway 50 in prong 32 and is sealed in place as by soldering. Extension 62 can merely be soldered or welded to the wall 10 or cover 26 of the can, or directly to the inside surface of prong 34. Where only one tab is used for each foil, it is preferably located about half way between the wound ends of the foil. This provides the minimum length of foil through which charging or discharging currents must travel. Similarly where more than one tab is used per foil, it is desirable that the tabs be arranged approximately equidistant from the ends of the foil and with the space between adjacent tabs about twice the space between an end tab and the end of the winding.

Before tab extension 60 is sealed in place, the assembly is impregnated by subjecting the entire can to a subatmospheric pressure of less than one millimeter of mercury, and heated at a temperature of 125° F. for about 18 to 36 hours. The entire can can be kept immersed in one of the above-identified impregnants during or at the end of this operation, and then the pressure is broken to permit the impregnant to be sucked into the can. The small unsealed space in passageway 50 would be sufficient for this purpose. The above impregnation can be repeated a second as well as a third time for best results. If desired, the impregnation can also be carried out before the cover 26 is secured into place.

Instead of using capacitor foils narrower than the interelectrode spacers, the foils can be arranged in the usual "non-inductive" fashion so that one edge of one foil projects from one end of the winding, the other edge of the other foil projecting from the opposite end. Leads can then merely be soldered to the projecting foils. In order to take full advantage of the high energy storage ability of the constructions of the present invention, they should be built to withstand operating potentials of over 2000 volts. To this end at least three thicknesses of 0.3 mil high density paper should be used to make the laminated inter-electrode spacer. Four thicknesses of such paper appear to give best results, however. In addition the thickness of the individual sheets of paper should be kept to a minimum and about 0.3 mil in the three or four ply construction is sufficient. The use of floating foils is not needed so that the construction is simplified and the cost is reduced.

As many apparently widely different embodiments of this invention may be made without departing from the spirit and scope hereof, it is to be understood that the invention is not limited to the specific embodiments hereof except as defined in the appended claim.

For example the capacitor terminals can both be insulated from any metallic housing with which it is encased as by providing two insulated connection prongs. Electrically non-conductive casings can be used in place of the metallic one shown.

What is claimed is:

In an energy storage capacitor for operation under an electrical potential of over 3500 volts the combination of oppositely polarized electrodes separated by a spacer of a plurality of tissue layers of limited porosity paper having an apparent specific gravity higher than 1.02 and through which passes only 5% of a block impression of a methyl violet ink in an alcoholic vehicle, and an impregnant in said spacer selected from the class consisting of liquid polybutenes and unsaturated liquid linear polymerization products of a mixture of aliphatic monoolefins having less than 12 carbon atoms at least half of such monolefins having four carbon atoms, and 0.5 to 10% of an aliphatic diolefin having less than 12 carbon atoms, said products having an iodine number as determined by Wijs' method between 20 and 70, the dielectric having an average molecular weight between 1200 and 4200, and containing substantially no molecules with a molecular weight lower than 450.

(References on following page)

References Cited in the file of this patent

UNITED STATES PATENTS

| | | |
|---|---|---|
| 2,665,400 | Walker | Jan. 5, 1954 |
| 2,711,498 | Robinson | June 21, 1955 |

OTHER REFERENCES

"Important Properties of Electrical Insulating Papers," by H. H. Race, in the Paper Industry and Paper World, November 1940, pp. 792–796.